(12) United States Patent  
Hofbauer et al.

(10) Patent No.: US 7,728,446 B2  
(45) Date of Patent: Jun. 1, 2010

(54) RING GENERATOR

(75) Inventors: Peter Hofbauer, West Bloomfield, MI (US); Patrick McCleer, Jackson, MI (US)

(73) Assignee: Advanced Propulsion Technologies, Inc., Goleta, CA (US)

( * ) Notice: Subject to any disclaimer, the term of this patent is extended or adjusted under 35 U.S.C. 154(b) by 914 days.

(21) Appl. No.: 10/560,147

(22) PCT Filed: Jun. 25, 2004

(86) PCT No.: PCT/US2004/020596

§ 371 (c)(1),  
(2), (4) Date: Dec. 9, 2005

(87) PCT Pub. No.: WO2005/060381

PCT Pub. Date: Jul. 7, 2005

(65) Prior Publication Data

US 2006/0138777 A1    Jun. 29, 2006

Related U.S. Application Data

(60) Provisional application No. 60/482,848, filed on Jun. 25, 2003.

(51) Int. Cl.  
*F02B 63/04* (2006.01)  
*F03D 9/00* (2006.01)  
*H02P 9/04* (2006.01)

(52) U.S. Cl. .................. 290/1 A; 290/1 R; 290/44; 123/46 R

(58) Field of Classification Search ........... 290/1 R, 290/1 A, 4 R, 44; 310/12, 14, 15, 20, 23, 310/24, 30; 123/46 R  
See application file for complete search history.

(56) References Cited

U.S. PATENT DOCUMENTS

| 1,167,366 A * | 1/1916 | Fessenden ............ 310/15 |
| 1,232,174 A | 7/1917 | Bachelet |
| 1,233,621 A | 7/1917 | Twombly |
| 1,569,497 A | 1/1926 | Johnson |

(Continued)

FOREIGN PATENT DOCUMENTS

DE    4243255    6/1994

(Continued)

OTHER PUBLICATIONS

Joe Kaiser, Electrical Power Motors, Controls, Generators, Transformers. The Goodheart-Willcox Company, Inc, pp. 125, 126, 128, 129.*

(Continued)

*Primary Examiner*—Julio Gonzalez  
(74) *Attorney, Agent, or Firm*—GanzLaw, P.C.

(57) ABSTRACT

The present invention is a rotary device that may be adapted for use as a propeller assembly and electrical generator for aerial vehicles or other vehicles intended for fluid media. In one example, the device includes a ring assembly having a plurality of centrally linked blades coupled to a rotatable common hub. Rotary motion of the ring assembly is facilitated by coupling it to an opposed cylinder, opposed piston, internal combustion. The ring assembly includes components of an electrical power generating system so that electrical power is produced from the rotation of the ring assembly.

21 Claims, 12 Drawing Sheets

U.S. PATENT DOCUMENTS

| | | | |
|---|---|---|---|
| 1,616,137 A | 2/1927 | Palmer | |
| 1,639,334 A | 8/1927 | Ford | |
| 1,719,537 A | 7/1929 | Dulche | |
| 1,837,620 A | 12/1931 | Karl | |
| 1,875,838 A | 9/1932 | Winckler | |
| 2,041,708 A | 5/1936 | Harper, Jr. | |
| 2,093,433 A | 9/1937 | Greene | |
| 2,254,817 A | 9/1941 | Blenker | |
| 2,608,052 A * | 8/1952 | Bent | 60/596 |
| 2,693,076 A | 11/1954 | Francis | |
| 2,823,653 A * | 2/1958 | Dildine | 123/46 R |
| 2,904,701 A | 9/1959 | Colgate | |
| 3,105,153 A | 9/1963 | James | |
| 3,106,896 A | 10/1963 | Van Der Lely et al. | |
| 3,200,800 A | 8/1965 | Du Bois | |
| 3,234,395 A * | 2/1966 | Colgate | 290/1 R |
| 3,339,093 A * | 8/1967 | Beers | 310/15 |
| 3,347,215 A | 10/1967 | Pescara | |
| 3,485,221 A | 12/1969 | Feeback | |
| 3,501,087 A | 3/1970 | Benaroya | |
| 3,541,362 A | 11/1970 | Pouit | |
| 3,669,571 A | 6/1972 | Benaroya | |
| 3,766,399 A * | 10/1973 | Demetrescu | 290/40 R |
| 3,809,914 A * | 5/1974 | Kilgore et al. | 290/38 R |
| 3,895,620 A | 7/1975 | Foster | |
| 4,046,115 A | 9/1977 | Braun | |
| 4,087,205 A | 5/1978 | Heintz | |
| 4,095,663 A * | 6/1978 | Gaffney | 180/205 |
| RE30,176 E | 12/1979 | Beale | |
| 4,205,528 A | 6/1980 | Grow | |
| 4,239,977 A * | 12/1980 | Strutman | 290/44 |
| 4,242,050 A * | 12/1980 | Oakes | 416/170 R |
| 4,248,183 A | 2/1981 | Noguchi et al. | |
| 4,254,745 A | 3/1981 | Noguchi et al. | |
| 4,257,365 A | 3/1981 | Noguchi et al. | |
| 4,258,669 A | 3/1981 | Noguchi et al. | |
| 4,270,054 A | 5/1981 | Dowd | |
| 4,282,442 A * | 8/1981 | Massinger | 290/1 C |
| 4,305,349 A | 12/1981 | Zimmerly | |
| 4,335,318 A * | 6/1982 | Mabuchi et al. | 290/31 |
| 4,369,021 A * | 1/1983 | Heintz | 417/364 |
| 4,415,313 A | 11/1983 | Bouthors | |
| 4,419,969 A | 12/1983 | Bundrick, Jr. | |
| 4,429,668 A | 2/1984 | Nakagawa et al. | |
| 4,480,597 A | 11/1984 | Noguchi et al. | |
| 4,480,599 A * | 11/1984 | Allais | 123/46 R |
| 4,485,768 A * | 12/1984 | Heniges | 123/48 B |
| 4,491,096 A | 1/1985 | Noguchi et al. | |
| 4,532,431 A * | 7/1985 | Iliev et al. | 290/4 R |
| 4,565,165 A | 1/1986 | Papanicolaou | |
| 4,627,389 A | 12/1986 | Simon | |
| 4,649,283 A | 3/1987 | Berchowitz et al. | |
| 4,661,050 A | 4/1987 | Deminski | |
| 4,694,785 A | 9/1987 | Timmerman et al. | |
| 4,697,113 A | 9/1987 | Young | |
| 4,720,640 A | 1/1988 | Anderson et al. | |
| 4,776,166 A | 10/1988 | Dixon | |
| 4,815,294 A | 3/1989 | David | |
| 4,864,976 A | 9/1989 | Falerno | |
| 4,869,212 A | 9/1989 | Sverdlin | |
| 4,873,826 A | 10/1989 | Dhar | |
| 4,924,956 A | 5/1990 | Deng et al. | |
| 4,974,556 A | 12/1990 | Royse | |
| 4,975,026 A * | 12/1990 | Pruszenski, Jr. | 417/340 |
| 4,977,864 A | 12/1990 | Grant | |
| 5,058,536 A | 10/1991 | Johnston | |
| 5,058,537 A | 10/1991 | Paul et al. | |
| 5,115,725 A | 5/1992 | Horiuchi | |
| 5,163,388 A | 11/1992 | Jonsson | |
| 5,280,213 A | 1/1994 | Day | |
| 5,397,922 A * | 3/1995 | Paul et al. | 290/1 A |
| 5,406,911 A | 4/1995 | Hefley | |
| 5,413,074 A | 5/1995 | Horiuchi | |
| 5,421,293 A | 6/1995 | Noltemeyer et al. | |
| 5,427,067 A | 6/1995 | Horiuchi | |
| 5,476,074 A | 12/1995 | Boggs et al. | |
| 5,479,894 A | 1/1996 | Noltemeyer et al. | |
| 5,559,379 A | 9/1996 | Voss | |
| 5,560,208 A | 10/1996 | Halimi | |
| 5,560,327 A | 10/1996 | Brackett | |
| 5,586,540 A | 12/1996 | Marzec et al. | |
| 5,654,596 A | 8/1997 | Nasar | |
| 5,693,991 A | 12/1997 | Hiterer | |
| 5,775,273 A | 7/1998 | Beale | |
| 5,794,582 A | 8/1998 | Horiuchi | |
| 5,850,111 A | 12/1998 | Haaland | |
| 5,884,590 A | 3/1999 | Minculescu | |
| 5,893,343 A | 4/1999 | Rigazzi | |
| 6,141,971 A | 11/2000 | Hanes | |
| 6,147,415 A | 11/2000 | Fukada | |
| 6,170,443 B1 | 1/2001 | Hofbauer | |
| 6,199,519 B1 | 3/2001 | Van Blarigan | |
| 6,486,582 B1 * | 11/2002 | Patarchi | 310/166 |
| 6,513,464 B1 | 2/2003 | Busch | |
| 6,513,465 B2 | 2/2003 | Fukuoka et al. | |
| 6,513,466 B2 | 2/2003 | Bignion | |
| 6,541,875 B1 | 4/2003 | Berlinger et al. | |
| 6,717,280 B1 * | 4/2004 | Bienville | 290/1 R |
| 2002/0135257 A1 * | 9/2002 | Umeda | 310/179 |
| 2006/0124084 A1 | 6/2006 | Hofbauer et al. | |
| 2006/0138777 A1 | 6/2006 | Hofbauer et al. | |
| 2008/0012432 A1 * | 1/2008 | Togare | 310/24 |

FOREIGN PATENT DOCUMENTS

| | | |
|---|---|---|
| DE | 19503443 | 5/1995 |
| DE | 19503444 | 5/1996 |
| DE | 19503413 | 8/1996 |
| DE | 19943993 | 3/2001 |
| FR | 852918 | 3/1940 |
| GB | 531009 | 12/1940 |
| JP | 46-13884 | 4/1971 |
| JP | 48-25562 | 7/1973 |
| JP | 49-002206 B | 1/1974 |
| JP | 55-76827 | 5/1980 |
| JP | 58-10115 | 1/1983 |
| JP | 05113127 A | 5/1993 |
| JP | 7-102990 | 4/1995 |
| JP | 2000-104560 | 4/2000 |
| WO | WO9415073 | 7/1994 |
| WO | WO9816728 A | 4/1998 |
| WO | WO 02/48524 | 6/2002 |
| WO | WO 03/078809 | 9/2003 |
| WO | WO 03/078810 | 9/2003 |
| WO | WO 03/078835 | 9/2003 |
| WO | WO2005003532 | 1/2005 |
| WO | WO2005060381 C2 | 7/2005 |

OTHER PUBLICATIONS

JP Patent 135818, Helen Loverier.
PCT International Search Report dated Jun. 16, 2003 for PCT application No. PCT/US03/08708, filed Mar. 17, 2003, 3 pages.
PCT International Search Report dated Aug. 21, 2001 for PCT application No. PCT/US00/34122, filed Dec. 15, 2000, 3 pages.
PCT International Search Report and Written Opinion dated Oct. 19, 2004 for PCT application No. PCT/US04/20590, filed Jun. 25, 2004, 6 pages.
PCT International Search Report dated Sep. 8, 2003 for PCT application No. PCT/US03/08707, filed Mar. 17, 2003, 3 pages.
PCT International Search Report dated Aug. 1, 2003 for PCT application No. PCT/US03/08709, filed Mar. 17, 2003, 4 pages.
PCT International Search Report and Written Opinion dated Nov. 30, 2005 for PCT application No. PCT/US04/20596, filed Jun. 24, 2004, 6 pages.

PCT Written Opinion dated Sep. 2, 2003 for PCT application No. PCT/US00/34122, filed Dec. 15, 2000, 4 pages.

PCT International Preliminary Examination Report dated Aug. 18, 2004 for PCT application No. PCT/US00/34122, filed Dec. 15, 2000, 3 pages.

First Office Action issued by the State Intellectual Property Office of the People's Republic of China, for related Chinese patent application No. 200480017632.3, dated Sep. 21, 2007, English translation only, 11 pages.

Second Office Action issued by Japanese Patent Office for corresponding Japanese application No. 2003-576788 dated Oct. 23, 2007, Both English and Japanese translations included, 5 pages total.

First Office Action issued by Japanese Patent Office for corresponding Japanese application No. 2003-576788 dated Mar. 6, 2007, English translations only, 3 pages total.

Second Office Action issued by the State Intellectual Property Office of the People's Republic of China, for related Chinese patent application No. 200480017632.3, dated Jul. 4, 2008, English translation only, 4 pages.

European Search Report and EPO Form 1507 dated Nov. 12, 2008 for related European patent application No. EP08156757; 7 pages total.

\* cited by examiner

Engine Design Input Data

| Cylinder Bore | B | 32 | mm |
|---|---|---|---|
| Engine Stroke | S | 60 | mm |
| Conrod Length | L | 50 | mm |
| Engine Speed | N | 9182 | rpm |
| Compression Ratio | CR | 19 | |
| Intake/Boost Pressure (abs) | Pi | 0.9 | bar |
| Intake/Boost Temperature | Ti | 20 | C |
| Fuel ( D for diesel, G gasoline, M methanol) | | d | |
| Stroke (FOUR for 4 stroke, TWO 2 stroke) | | two | |
| Relative Air/Fuel ratio | Lambda | 1.5 | |
| Number of Cylinders | n | 2 | |

Estimated Engine Performance Data

| Cylinder Peak Pressure | Pmax | 66 | bar |
|---|---|---|---|
| Peak Pressure Phase (ATDC) | Alpha | 5 | deg |
| Break Mean Effective Pressure | BMEP | 4.52 | bar |
| Engine Power at the Given Speed | P | 9.0 | hp |
| Engine Torque at the Given Speed | T | 6.9 | Nm |

*Fig. 10*

| FAMILY 1a (two cylinder unit = opoc module, two gear-set) |||||||||||
|---|---|---|---|---|---|---|---|---|---|---|
| Cyl. | Mach | Speed | MPS | Piston Stroke || Power || opoc Weight || BSFC || Eff | Transmission |
| Nr. | Nr. | rpm | n/sec | cm | in | hp | kW | g | lbs | g/kWh | lbs/hp-hr | % | Planetary Transmission |
| 2 | 0.85 | 12500 | 11.0 | 2.64 | 1.04 | 9 | 6.7 | 1825 | 4.0 | 500 | 0.822 | 17% | Direct drive |
| 4 | 0.85 | 12500 | 11.0 | 2.64 | 1.04 | 17 | 12.7 | 3950 | 8.7 | 480 | 0.789 | 18% | Gear ratio: 1 =   0.66 |
| 6 | 0.85 | 12500 | 11.0 | 2.64 | 1.04 | 42 | 31.3 | 7743 | 17.1 | 430 | 0.707 | 20% | Gear ratio: 1 =   0.39 |

| FAMILY 1b (only one standardized one cylinder unit = opoc module, but three gear-set) |||||||||||
|---|---|---|---|---|---|---|---|---|---|---|
| Cyl. | Mach | Speed | MPS | Piston Stroke || Power || opoc Weight || BSFC || Eff | Transmission |
| Nr. | Nr. | rpm | n/sec | cm | in | hp | kW | g | lbs | g/kWh | lbs/hp-hr | % |  |
| 2 | 0.68 | 10000 | 10.0 | 3.00 | 1.18 | 9 | 6.7 | 3150 | 6.9 | 450 | 0.740 | 19% | Direct drive   1.2 |
| 4 | 0.68 | 10000 | 10.0 | 3.00 | 1.18 | 17 | 12.7 | 6350 | 14.0 | 430 | 0.707 | 20% | Gear ratio: 1 =   2.08 |
| 6 | 0.748 | 11000 | 11.0 | 3.00 | 1.18 | 42 | 31.3 | 9550 | 21.1 | 400 | 0.658 | 21% | Gear ratio: 1 =   0.45 |

| FAMILY 2 (two cylinder units = opoc modules, one gear-set, no 6 cylinder) |||||||||||
|---|---|---|---|---|---|---|---|---|---|---|
| Cyl. | Mach | Speed | MPS | Piston Stroke || Power || opoc Weight || BSFC || Eff | Transmission |
| Nr. | Nr. | rpm | n/sec | cm | in | hp | kW | g | lbs | g/kWh | lbs/hp-hr | % |  |
| 2 | 0.85 | 12500 | 11.0 | 2.64 | 1.04 | 9 | 6.7 | 1825 | 4.0 | 500 | 0.822 | 17% | Direct drive |
| 2 | 0.85 | 8300 | 11.0 | 3.98 | 1.57 | 17 | 12.7 | 5125 | 11.3 | 400 | 0.658 | 21% | Direct drive |
| 4 | 0.85 | 8300 | 11.0 | 3.98 | 1.57 | 42 | 31.3 | 10600 | 23.4 | 380 | 0.625 | 23% | Gear ratio: 1 =   0.59 |

| FAMILY 3 (three cylinder units = opoc modules, all direct drive and 2 cylinders) |||||||||||
|---|---|---|---|---|---|---|---|---|---|---|
| Cyl. | Mach | Speed | MPS | Piston Stroke || Power || opoc Weight || BSFC || Eff |  |
| Nr. | Nr. | rpm | n/sec | cm | in | hp | kW | g | lbs | g/kWh | lbs/hp-hr | % |  |
| 2 | 0.85 | 12500 | 11.0 | 2.64 | 1.04 | 9 | 6.7 | 1825 | 4.0 | 500 | 0.822 | 17% | Direct drive |
| 2 | 0.85 | 8300 | 11.0 | 3.98 | 1.57 | 17 | 12.7 | 5125 | 11.3 | 400 | 0.658 | 21% | Direct drive |
| 2 | 0.85 | 4900 | 11.0 | 6.73 | 2.65 | 42 | 31.3 | 24950 | 55.0 | 340 | 0.559 | 25% | Direct drive |

RING GENERATOR

RELATED APPLICATION

This application claims priority from U.S. Provisional Application Ser. No. 60/482,848, filed Jun. 25, 2003, the contents of which are hereby incorporated by reference as if recited in full herein for all purposes.

GOVERNMENT FUNDING

The U.S. Government has a paid-up license for certain inventions claimed in this document and the right in limited circumstances to require the patent owner to license others on reasonable terms, as provided for by the terms of Contract No. DAAH01-03-C-R077 awarded by U.S. Army Aviation and Missile Command.

FIELD OF INVENTION

The present invention relates generally to electric power generators, and more specifically to an electric power generator powered by a two-stroke internal combustion engine having a pair of opposed cylinders, each cylinder having a pair of opposed pistons.

BACKGROUND OF THE INVENTION

Unmanned Aerial Vehicles (UAVs) and Organic Aerial Vehicles (OAVs) used in military, law enforcement, surveillance and security operations present particularly challenging requirements for power, weight, fuel consumption, vibration, starting and electrical generation. Designing appropriate systems for such applications are subject to many challenging constraints. For example, the vehicles must be designed to have minimal visibility, high power to weight ratio and high thrust to weight ratio, low noise production, low vibration, fuel efficiency, long flight times, and mechanical simplicity for serviceability in the field.

Satisfying the foregoing constraints largely depends on the nature of the engine for thrust generation, the mechanism for lift, and the system for power generation. Unfortunately, while existing efforts might satisfactorily address any given constraint, those efforts have failed to provide a satisfactory solution for multiple constraints.

It has been determined that for safety and logistics in military operations that in the future fuels will be restricted to standard DOD heavy fuels, such as JP8.

Further, different systems and applications require different power and electrical outputs suitable for a particular purpose. It has been determined that engines having a range of power output from 1.5 hp to 35 hp would have great utility for many applications, such as to power UAVs and OAVs.

Providing an inventory of engines of various sizes and capacities is prohibitive. There is a need to provide a wide range of engine power outputs while maintaining desired weight, packaging and field logistics demands.

Accordingly, there is a substantial need for aerial vehicles and other applications with improved engine and electrical power generating systems. A modular approach to accommodate differing power requirements is also needed.

SUMMARY OF THE INVENTION

An embodiment of the present invention provides an aerial vehicle with a power generating device particularly suitable for affording minimal visibility, high power to weight ratio and high thrust to weight ratio, low noise production, low vibration, fuel efficiency, long flight times, and mechanical simplicity for serviceability in the field An embodiment of the present invention comprises a power generating device that includes a ring assembly having a plurality of blades connected to a common hub. A magnetic flux generating mechanism is coupled to a circumferential element on the ring assembly. A current conducting element is disposed on the power generating device, and cooperates with the magnetic flux generating mechanism so that relative movement therebetween induces electric current within the current conducting element.

Another embodiment of a power generating device in accordance with the present invention comprises an opposed piston, opposed cylinder engine having a crankshaft, a ring assembly having a shaft coupled to the crankshaft, and at least one magnetic flux generating element in cooperative engagement with at least one current conducting element disposed in fixed relation to the ring assembly.

Another embodiment of a power generating device in accordance with the present invention comprises a ring assembly having a plurality of blades connected to a rotatable common hub. The hub is rotated by an opposed piston, opposed cylinder engine. At an end opposite the hub, the ring assembly includes a circumferential element. At least one magnetic flux generating element includes a plurality of magnets and is coupled to the circumferential element along an inside diameter. At least one current conducting element is disposed on the power generating device in fixed relation to the at least one flux generating element, and cooperates therewith so that relative rotating movement therebetween induces electric current flow in the current conducting element.

These and other embodiments are described in more detail in the following detailed descriptions and the figures.

The foregoing is not intended to be an exhaustive list of embodiments and features of the present invention. Persons skilled in the art are capable of appreciating other embodiments and features from the following detailed description in conjunction with the drawings.

BRIEF DESCRIPTION OF THE DRAWINGS

FIGS. 6 and 7 are cross-sectional and isometric views of an OPOC engine adapted to transmit linear reciprocation of one or more pistons to rotate the ring assembly, in accordance with an embodiment of the present invention;

FIG. 10 is a table of parameters of a motivating mechanism suitable for use in an OAV, in accordance with an embodiment of the present invention;

FIG. 11 is a table of power generating systems, in accordance with an embodiment of the present invention;

DETAILED DESCRIPTION OF THE INVENTION

Figure 1:
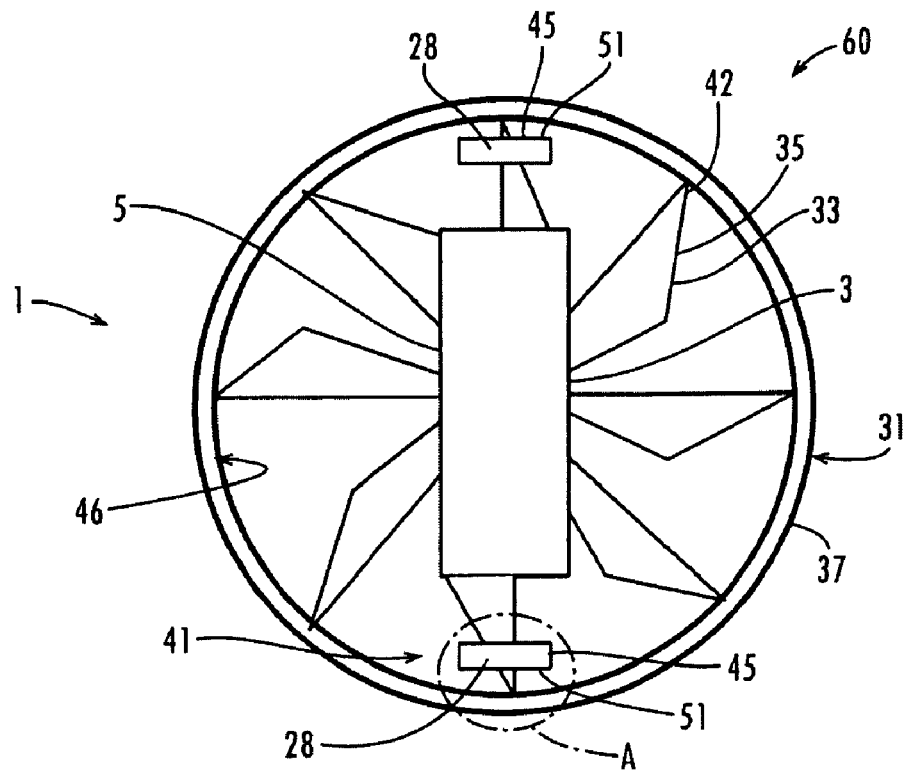
FIG. 1 is a bottom view of an embodiment of a power generating system comprising a ring assembly adapted for providing thrust propulsion, in accordance with the present invention.

In the following detailed description, reference is made to the accompanying drawings which form a part hereof wherein like numerals designate like parts throughout, and in which is shown by way of illustration specific embodiments in which the invention may be practiced. It is to be understood that other embodiments may be utilized and structural or logical changes may be made without departing from the scope of the present invention. Therefore, the following detailed description is not to be taken in a limiting sense, and the scope of the present invention is defined by the appended claims and their equivalents.

The present invention is directed towards power generating systems. In accordance with the present invention, an embodiment of a power generating system comprises a current generating device powered by a two stroke, opposed piston opposed cylinder (OPOC) internal combustion engine. Embodiments of the present invention are particularly suitable to provide thrust and electric power for an aerial vehicle. By way of example, but not limited thereto, embodiments of the present invention are adapted for use as a propeller assembly and electrical generator for use on an unmanned aerial vehicle (UAV), or an organic aerial vehicle (OAV). Embodiments of the power generating system are adapted to use JP8 fuel, as specified for use by the military. The principles of the inventive concepts are illustrated in the following detailed description of various elements and exemplary embodiments, and in reference to FIGS. 1-13, wherein similar features share common reference numerals. Some components may not be shown in some of the figures so that certain features may be made more clear.

In accordance with an embodiment of the present inversion, a power generating system comprises a rotary wing adapted to provide thrust for propulsion through a fluid, such as air and water, as well as to generate electrical power. In applications of the power generating system for use as a power source for a UAV or OAV, embodiments of the present invention provide a combination of thrust, lift, and electrical power.

Figure 2:
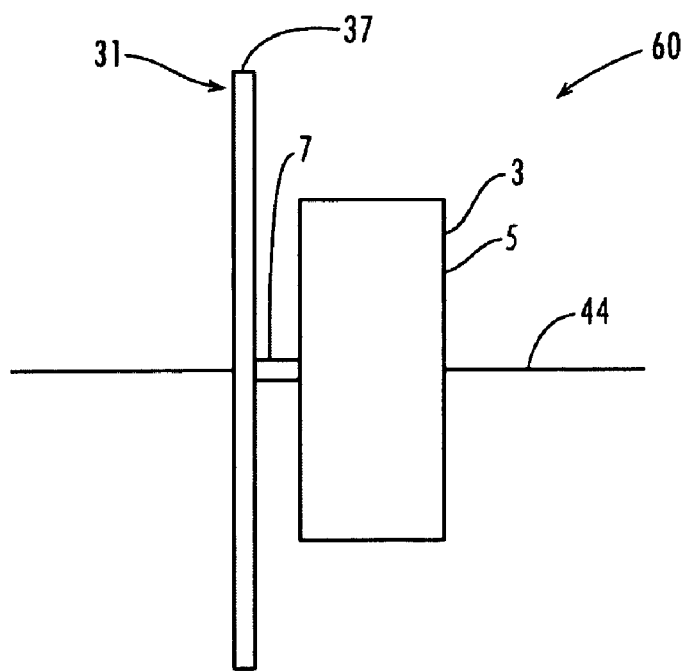
FIG. 2 is a side view of the embodiment of FIG. 1.
Figure 3:
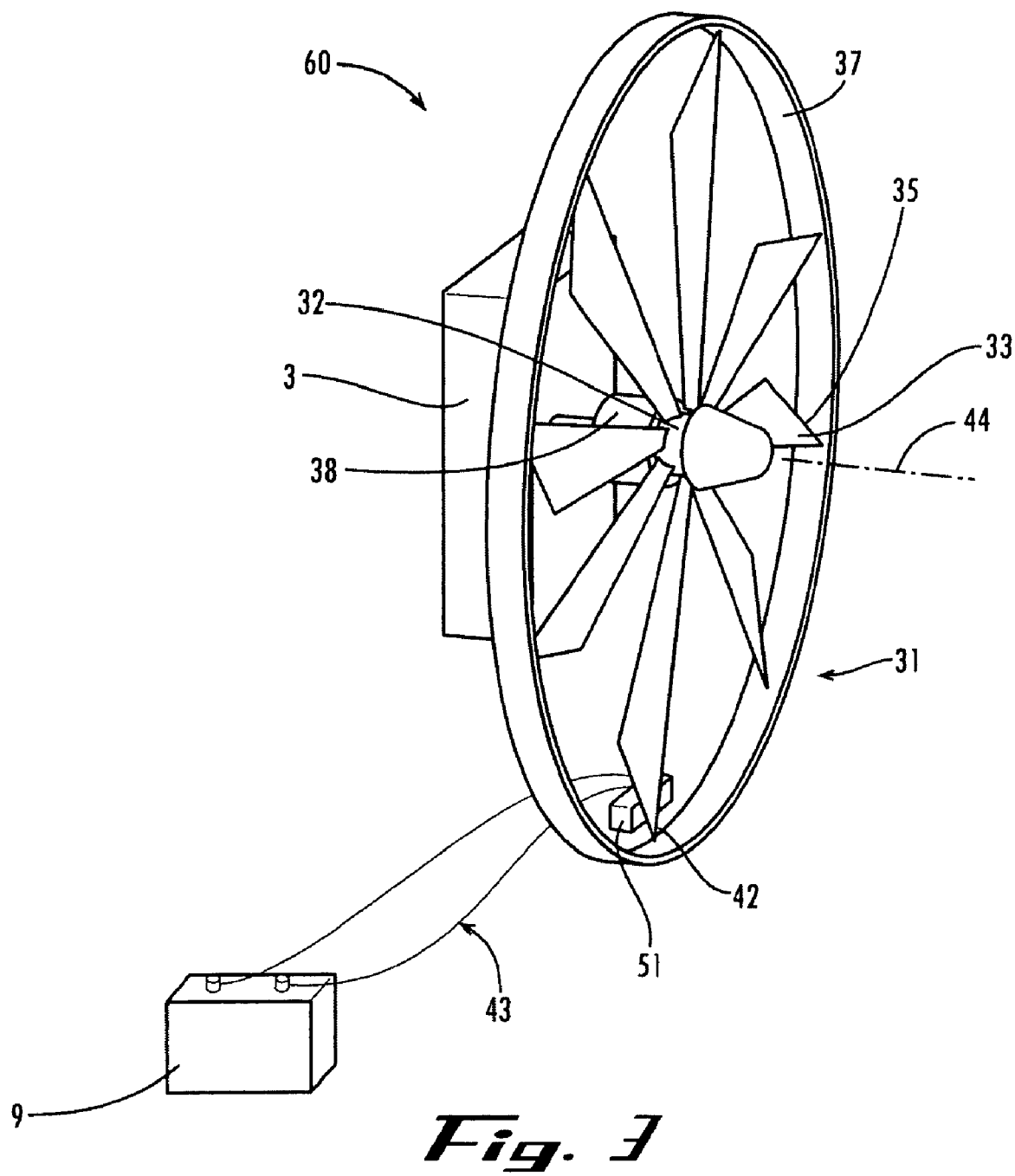
FIG. 3 is a perspective view of the embodiment of FIG. 1.

FIGS. 1, 2 and 3 are bottom, side, and isometric views, respectively, of an embodiment of a power generating system 60 comprising a ring assembly 31 adapted for providing thrust propulsion, in accordance with the present invention. The ring assembly 31 comprises a hub 38, a plurality of blades 33, and a circumferential element 37. The blades 33 are adapted for driving a fluid, and in the case of an aerial vehicle, providing lift and thrust, by acting as a propeller. The blades 33 comprise a hub end 32 and a tip end 35, the hub end 32 being coupled to and radiating from the hub 38, wherein the blades 33 radiate from the hub 38 in a substantially coplanar arrangement defining a blade plane, which is coplanar with ring 37, as seen in FIG. 2. The tip end 35 terminates at a blade tip 42. The distance from the hub 38 to the blade tip 42 defines a blade radius.

Each associated tip end 35 is coupled to the circumferential element 37 that defines a whole or partial circle or hoop having a radius measured from the hub 38 to the circumferential element 37. As shown in the embodiment of FIGS. 1-3, the circumferential element 37 is a continuous hoop coupled to the blade tip 42 of each blade 33.

Rotary motion of the ring assembly 31 about a hub axis 44 perpendicular to the blade plane 30 is facilitated by coupling the hub 38 to a rotary motivating mechanism 3 for imparting rotary motion to the ring assembly 31. Suitable embodiments of rotary motivating mechanisms 3 are detailed below. In an embodiment in accordance with the present invention, the hub 38 is coupled directly to the motivating mechanism 3, such as by coupling the hub 38 to a drive shaft 7, shown in FIG. 2, coupled to a crankshaft (not shown) of the rotary motivating mechanism 3 comprising an internal combustion engine, for example. In accordance with another embodiment of the present invention, the hub 38 is linked to the rotary motivating mechanism 3 by a drive belt (not shown).

Figure 4:
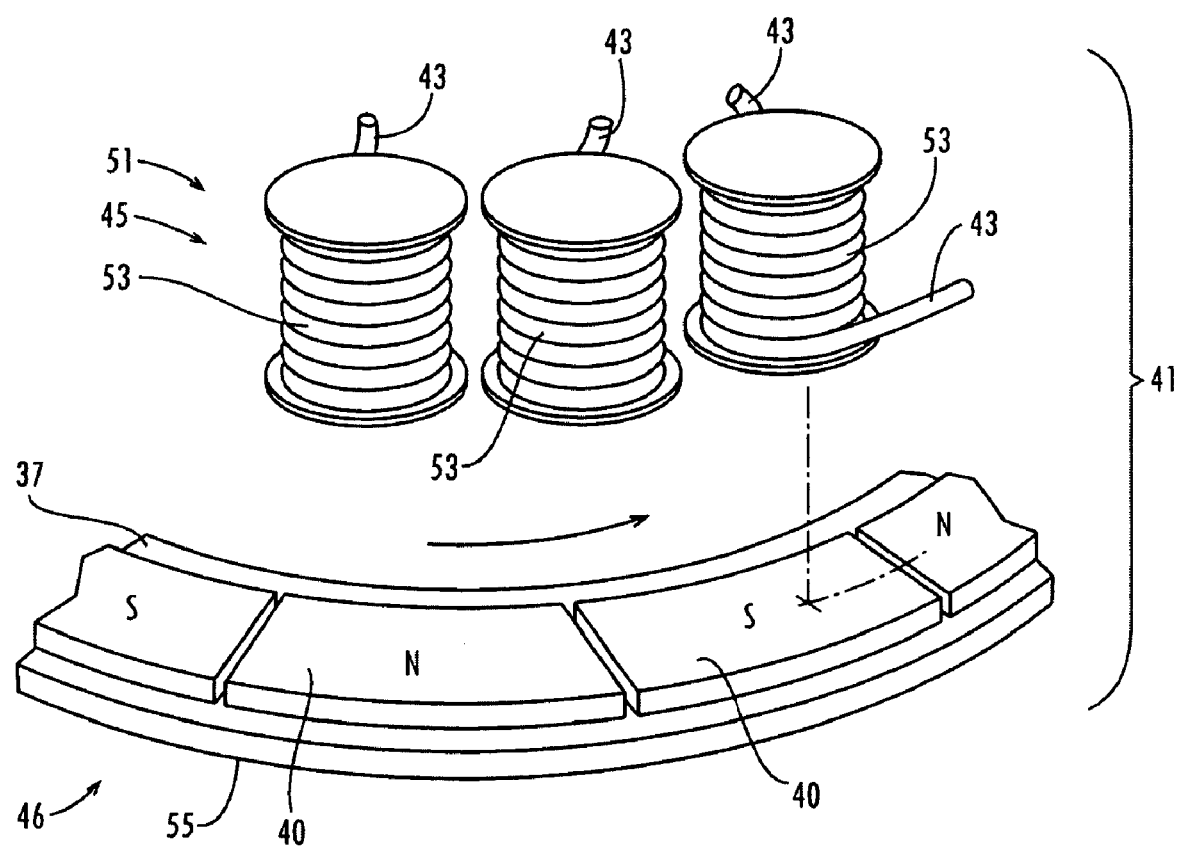
FIG. 4 is a partial perspective view of detail section "A" of FIG. 1 of an electric power generating device, in accordance with an embodiment of the present invention.

FIG. 4 is a partial view of an electric power generating device 41, in accordance with an embodiment of the present invention. The electric power generating device 41 comprises a magnetic flux generating mechanism 46 and a current conducting element 51. The magnetic flux generating mechanism 46 is adapted for inducing current in the current conducting element 51. The current conducting element 51 comprises an electrical communication element 43 adapted to conductively transfer current to an external apparatus, such as, but not limited to, electrical systems onboard an OAV.

In accordance with an embodiment of the present invention as shown in FIG. 4, the magnetic flux generating mechanism 46 comprises a plurality of adjacent magnets 40 of alternating polarity, and the current conducting element 51 comprises a plurality of coils 53 comprising electrically conductive material. Electrical power is generated when there is relative movement between the magnets 40 and the coils 53. The current created by this relative motion is transferred via the communication element 43, to other components 9, such as, but not limited to storage batteries. The current may also be reversed so that the system operates as a starter.

The magnetic flux generating mechanism 46 comprises any component that is capable of producing a magnetic field. As used herein, "magnet" means a permanent magnet, an inductive magnet, or other component known in the art having the properties of a magnet for providing a magnetic field. Magnet may also refer to a plurality of adjacent magnets arranged as a series of alternating north and south polarity magnets. In addition, magnet refers to a Halbach series as described in Patent Cooperation Treaty Application No. PCT/US 03/08708 entitled ENGINE WITH POWER GENERATING CAPABILITY, filed on Mar. 17, 2003. The term magnet may also include an iron backer 55 in direct physical contact with the individual magnetic components, or an iron backer 55 that is separated from the magnetic components by an air gap.

The current conducting element 51 comprises any component that is capable of conducting electricity, including, but not limited to, one or more conductive metal plates and coils. As used herein, the terms "coil", "coil winding", "winding", "field winding", "surface winding", and "stator" refers to a structure upon which a magnet may act to induce current, such as, but not limited to a winding of an electrically conductive substance, for example, copper or aluminum wire.

Referring again to FIGS. 1-4, the electric power generating device 41 comprises a series of magnets 40 coupled to the ring assembly 31 with alternating polarity. Accordingly, motion of the ring assembly 31 will cause a corresponding motion of the magnets 40.

In accordance with an embodiment of the invention, the relative thickness of the magnets 40 is minimized, and adapted to be lightweight. Rotation of the series of magnets 40 at a high rate of speed relative to a current conducting element 51, the change in flux will be high. Since the power generated is a product of flux times flux change, a fast moving series of magnets 40 relative to a current conducting element 51 generates a predetermined amount of electrical power in the current conducting element 51.

In an embodiment of the present invention, the series of magnets 40, shown generally in FIG. 4, comprise permanent magnets having a radial thickness of about 3 mm. Each individual magnet 40 in the series of magnets 40 has an axial length of about 10 mm; the axial length is generally perpendicular to the radial thickness. Also, magnetic poles are provided on a ring assembly 31, therefore a corresponding number of alternating magnets 40 are coupled to the ring assembly 31.

One suitable magnet material, among others, is bonded neodymium material with a residual strength of about 0.58 Tesla.

Figure 5:
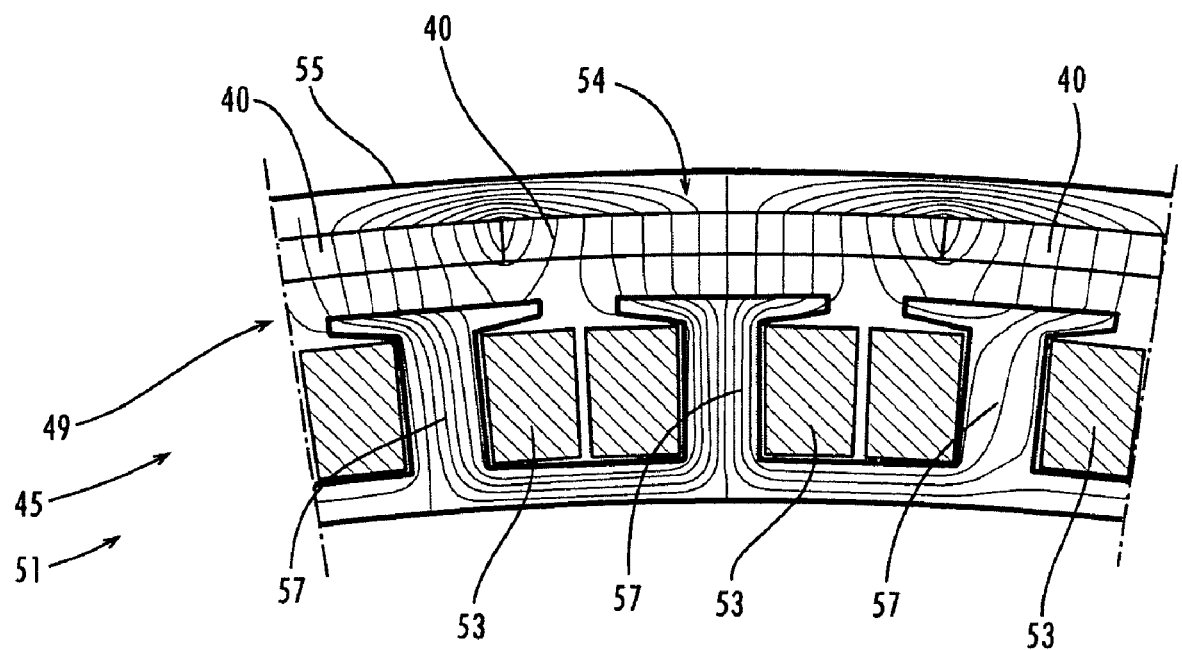
FIG. 5 is a cross-sectional view of a portion of a magnetic flux generating mechanism and a current conducting element and an associated mapping of the magnet flux, in accordance with an embodiment of the present invention.

FIG. 5 is a cross-sectional view of a portion of a magnetic flux generating mechanism 46 and a current conducting element 51 and an associated mapping of the magnet flux 54, in accordance with an embodiment of the present invention. The magnetic flux generating mechanism 46 is a series of magnets 40 coupled to an iron backer 55. The current conducting element 51 comprises a stator 45 having a plurality of stator teeth 57 with adjacent coil windings 53. The magnets 40 are adjacent to and separated by an air gap from the stator teeth 57. Flux lines 54 are shown at a given point of relative rotation of the magnets 40 with respect to the stator 45, showing the flux looping from the iron backer 55, through the magnets 40, across the air gap 49 and through the stator teeth 57.

In another embodiment in accordance with the present invention, the series of magnets 40 are coupled to the inside diameter of the ring assembly 31. Centrifugal force produced by the rotation of the ring assembly 31 about the hub axis 44 is exploited to assist in coupling the magnets 40 to the ring assembly 31. In an embodiment in accordance with the present invention, the ratio of magnets 40 to stator teeth 57 is 2:3. By way of example, a system that comprises two magnets 40 includes three stator teeth 57 suitable for a 3-phase system. Multiples of this ratio are anticipated. One advantage of this ratio is the ability of the system to initiate a start, such as associated with engine cranking of a rotary motivation mechanism 3.

Referring again to FIGS. 1, 4 and 5, a current conducting element 51 is coupled to a stationary point 28 relative to the rotating ring assembly 31 and disposed to exploit the fluctuating magnet flux 54 field, as shown in FIG. 5, of a magnetic flux generating mechanism 46 coupled thereto.

The stator 45 comprises three independent coil windings 53 separated by stator teeth 57, as shown in FIG. 5, suitable for three-phase electric current production, as shown by way of example.

Embodiments of the electrical power generating device 41 comprises any number of individual stators 45 circumferentially disposed about the ring assembly 31. In one embodiment, shown in FIGS. 1 and 2, the electrical power generating device 41 incorporates two stators 45 coupled in fixed relation to the ring assembly 31, arranged at approximately 180 degrees apart, and placed in the wind shadow of the blade assembly 31. The two stators 45 balance the electric forces created by the rotating system. The coupling of the stators 45 may be on an engine support structure or duct of the intended application, for example, as will be further discussed below.

Referring again to FIG. 5, embodiments of the present invention comprise a magnetic flux generating mechanism 46 further comprising a means for containing and directing magnetic flux 54. In an embodiment, the flux 54 is contained and directed by a back iron or backer 55.

In an embodiment in accordance with the present invention, the circumferential element 37 is adapted to be a backer 55. In an embodiment, the circumferential element 37 comprises a mild steel continuous hoop adapted to support a magnetic flux generating mechanism 46 comprising a plurality of magnets 40.

Figure 14:
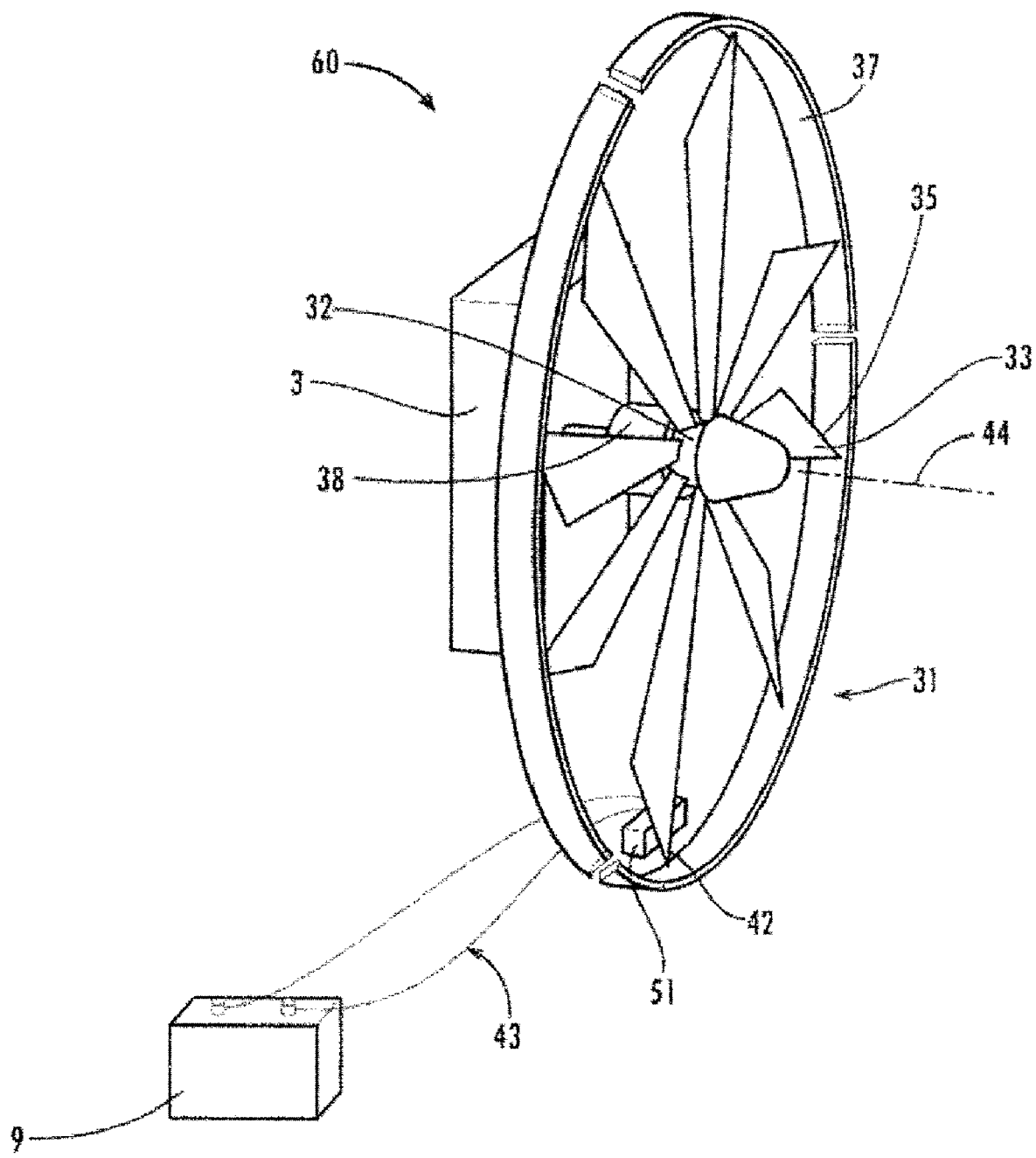
FIG. 14 is a perspective view of an embodiment showing three segments of arcs arranged at around 120 degrees apart on the rotor blade tip ends.

In another embodiment, the circumferential element 37 includes a plurality of segments of arc disposed about a predetermined radius from the hub 38 (not shown). The arcs are symmetrically arranged about a given radius to maintain a balanced rotating system. In one embodiment, shown in FIG. 14, three segments of arcs are arranged at about 120 degrees apart on the rotor blade tip ends 35. Each segment of arc further includes a series magnets 40 of alternating polarity.

Relative to the stationary stator 45, the fluctuating magnet flux 54 caused by rotating the ring assembly 31 with the attached magnets 40 induces a current. This current is directed to an external device 9, see FIG. 3, such as a storage battery or the electrical system of an OAV. Transferring the current is facilitated by a conductive element 43.

A rotary motivating mechanism 3 is used to cause the ring assembly 31 to rotate about the hub axis 44, shown in FIG. 2. A rotary motivating mechanism 3 is any apparatus that can produce rotary motion that can be transferred to the hub 38. For example, a rotary motivating mechanism 3 may be an internal combustion engine with a crankshaft that converts linearly reciprocating motion of pistons in a cylinder to rotary motion that can be transmitted outside the engine and adapted to rotate the hub 38 of the ring assembly 31.

One suitable rotary motivating mechanism 3 is an "Opposed Piston Opposed Cylinder" (OPOC) engine, as described in U.S. Pat. No. 6,170,443. Another suitable rotary motivating mechanism is described in Patent Cooperation Treaty Application No. PCT/US 03/08708 entitled ENGINE WITH POWER GENERATING CAPABILITY, filed on Mar. 17, 2003. The disclosures of the foregoing application and patent are hereby incorporated by reference in their entireties for all purposes.

Figure 6:
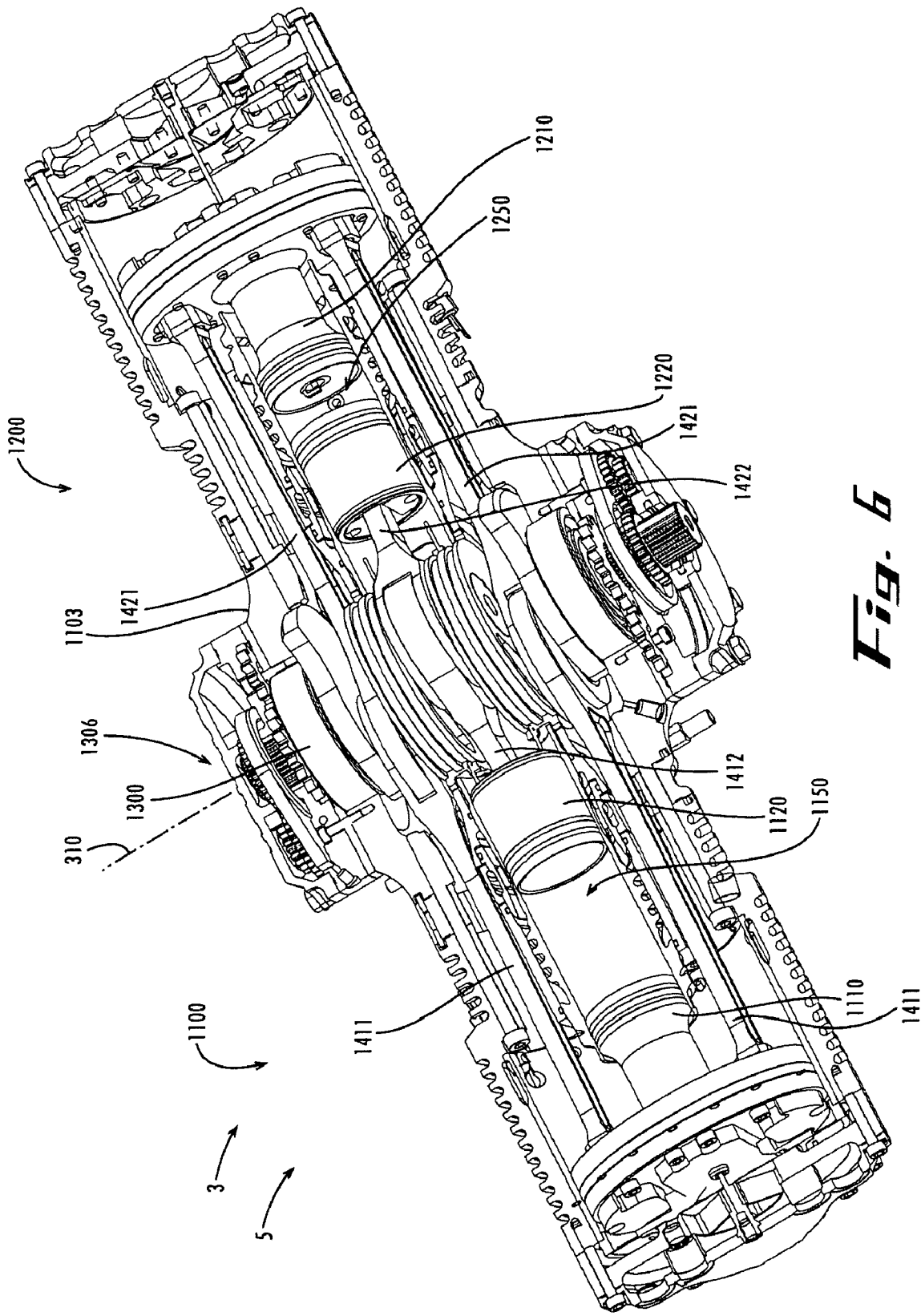
Figure 1:
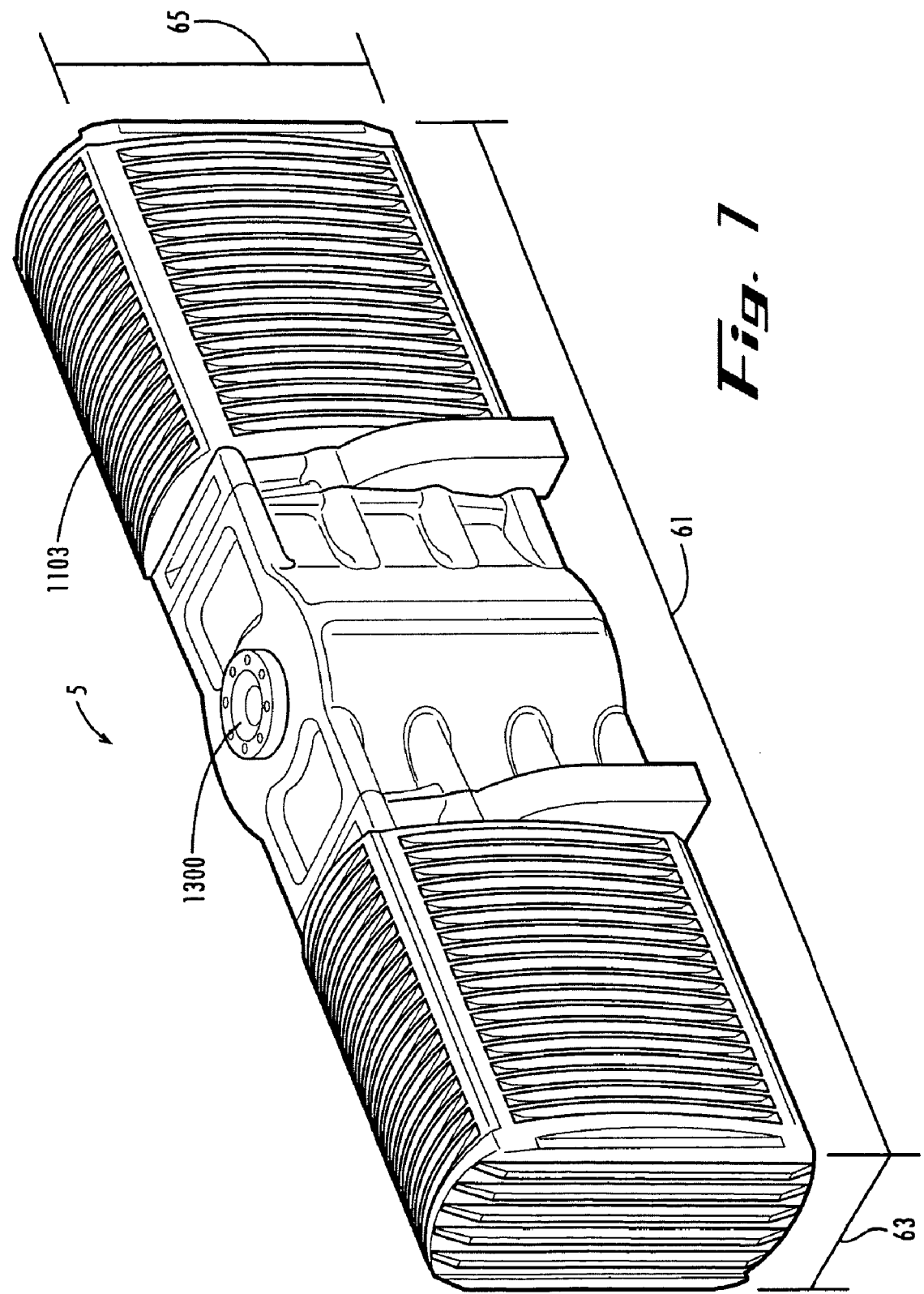

In an embodiment of the present invention, the rotary motivating mechanism 3 is an OPOC engine 5 described in co-pending PCT Application entitled: INTERNAL COMBUSTION ENGINE, filed on Jun. 25, 2004 (PCT/US04/20590), incorporated herein by reference in its entirety for all purposes. FIGS. 6 and 7 are cross-sectional and isometric views of an OPOC engine 5 adapted to transmit linear reciprocation of one or more pistons to rotate the ring assembly 31. The OPOC engine 5 is an opposed piston, opposed cylinder internal combustion engine having a central crankshaft 1300 inside a housing 1103. The crankshaft 1300 has a pair of inner pistons 1120 and 1220 disposed on a common linear axis. Each inner piston 1120, 1220 has a corresponding outer piston 1110, 1210 associated with it. Accordingly, inner pistons 1120,1220 and outer pistons 1110, 1210 form a combustion chamber 1150, 1250 inside a common cylinder 1100, 1200. Cylinders 1100, 1200 are aligned on a common linear axis. The arrangement of pistons 1120, 1220, 1110, 1210 and cylinders 1100 and 1200 on a common substantially linear axis may be generally termed an opposed piston, opposed cylinder ("OPOC") engine.

Each piston 1120, 1220, 1110, 1210 is linked to the central crankshaft 1300 by appropriate connecting elements 1411, 1421, 1412, 1422. The connecting elements 1411, 1421, 1412, 1422 transfer the linear reciprocation of each piston 1120, 1220, 1110, 1210 to the common crankshaft 1300, which in turn, rotates about an axis 310. By extending the crankshaft 1300 outside the housing 1103, or by adapting the crankshaft 1300 for coupling to external linking elements (not shown), this rotary motion can be transferred and adapted to rotate the ring assembly 31 about the hub axis 44.

Figure 8A:
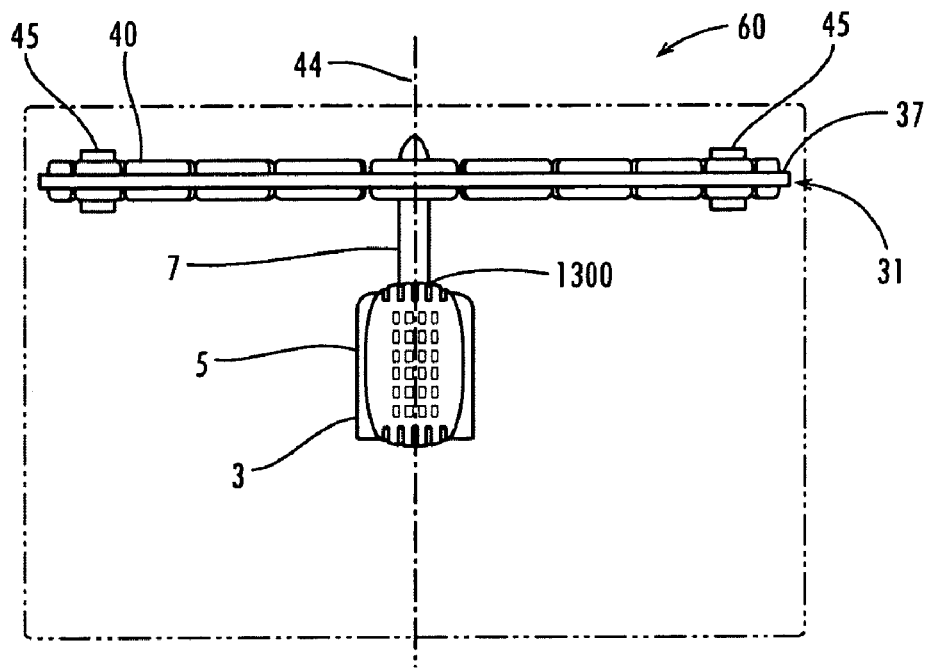
FIGS. 8A and 8B are side and bottom views, respectively, of a power generating system comprising an OPOC engine coupled to an electrical power generating device, in accordance with an embodiment of the present invention.
Figure 8B:
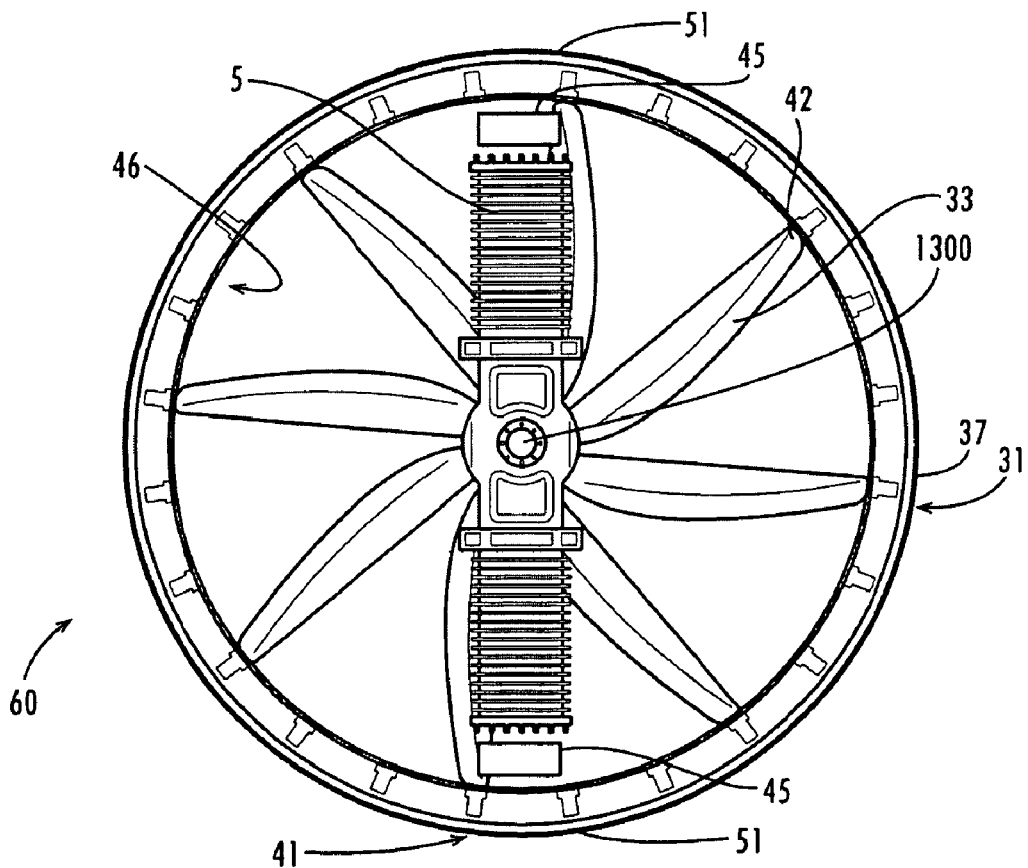

FIGS. 8A and 8B are side and bottom view, respectively, of a power generating system 60 comprising an OPOC engine 5 coupled to a thrust propulsion mechanism as described above.

Figure 9A:
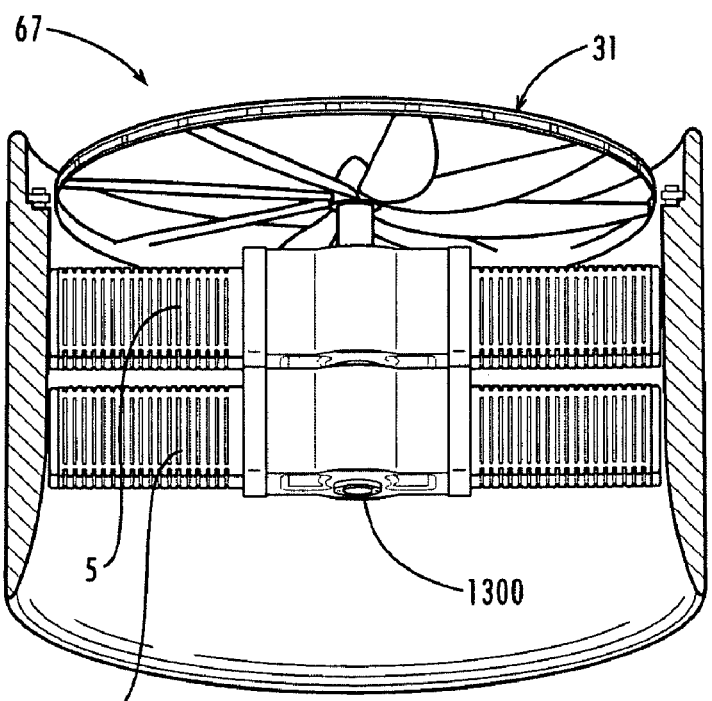
FIGS. 9A and 9B are embodiments of a power generating system comprising two and three OPOC engines, in accordance with an embodiment of the present invention.
Figure 9B:
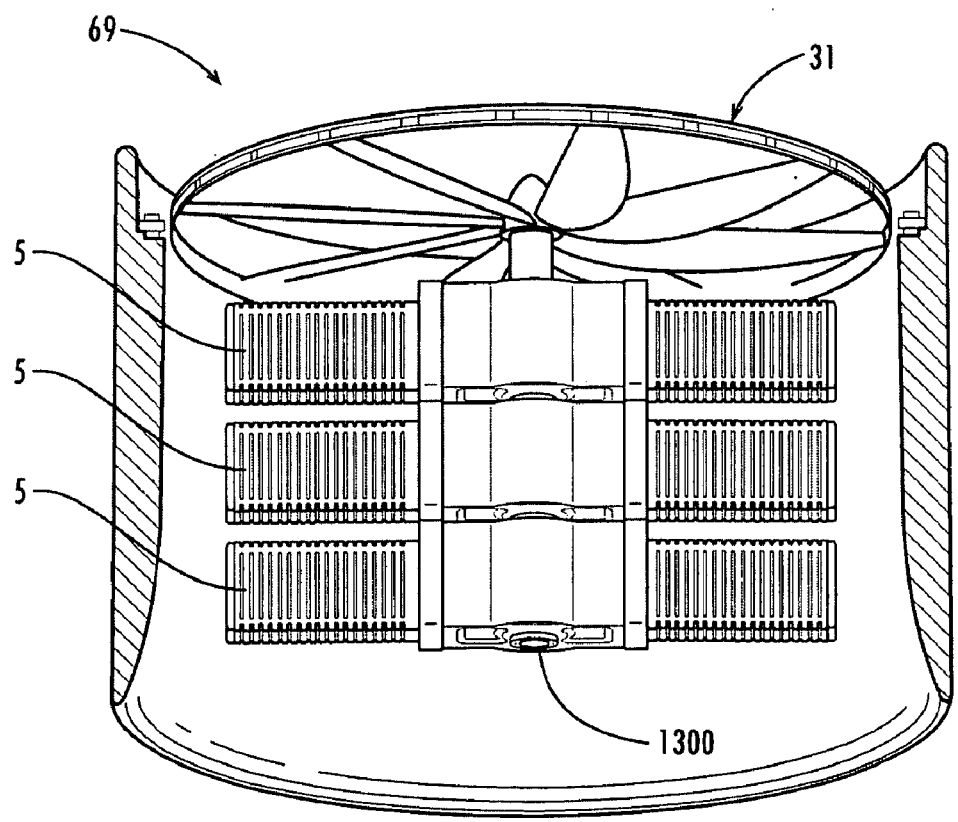

Other embodiments of a power generating system 60 in accordance with the present invention comprises a plurality of rotary motivating mechanisms 3. FIGS. 9A and 9B are side, partial cut-away views of two and three-engine power generating systems 67, 69, respectively. The two-engine power generating system 67 comprises two OPOC engines 5 sharing a common crankshaft 1300 that is coupled to and drives the hub 38 of the ring assembly 31. The three-engine power generating system 69 comprises three OPOC engines 5 sharing a common crankshaft 1300 that is coupled to and drives the hub 38 of the ring assembly 31. In this way, various power configurations are provided by coupling and decoupling a plurality of engines 5 to drive the ring assembly 31.

In another embodiment, each crankshaft 1300 is coupled to a transfer mechanism or clutching mechanism (not shown), for example. A clutching mechanism allows independent operation of each linked motivating mechanism 3. In this way, efficient operation may be appreciated, as individual motivating mechanisms 3 may be decoupled from a system as load requirements of the system change.

Transfer of the rotary motion from the mechanism to an external device may be facilitated by a linking element coupled to the crankshaft 1300 of the rotary motivating mechanism 3. Alternatively, the crankshaft 1300 may be adapted to extend beyond the housing 1103 of the rotary motivating mechanism 3 and coupled directly to the hub 38 of the ring assembly 31.

The linking element may simply be an extension of the crankshaft 1300, or it may be a driveshaft 7 coupled to the crankshaft 1300, or a transfer mechanism, for example. A transfer mechanism may be a speed differential apparatus that converts one rotational speed, for example the rotation of the crankshaft 1300, to a second rotational speed. A known speed differential apparatus is a gearbox, for example. The linking element may be any combination of shafts and transfer mechanisms, as required by a particular application.

In the embodiments shown in FIGS. 1-3, 8A and 8B, and 9A and 9B, a rotary motivating mechanism 3 is directly coupled to a ring assembly 31 via a linking element comprising the crankshaft 1300 coupled to a driveshaft 7. In an alternative embodiment (not shown), the rotary motivating mechanism 3 is coupled to a transfer element, such as a gearbox. The coupling of the transfer element to the mechanism 3 may be a direct coupling from the crankshaft 1300, or via intermediate linking elements, such as driveshaft 7 or belt (not shown).

In another embodiment, two external apparatus may be attached to opposing ends of a common crankshaft 1300 of the rotary motivating mechanism 3. For example, a ring generator 31 is linked to a first end of the crankshaft 1300 and a propeller to a second end of the crankshaft 1300. The propeller would rotate in the same direction of the crankshaft 1300 and may be coupled to an intermediate speed differentiating apparatus. Alternatively, the propeller, or any other external device, is rotated opposite the crankshaft 1300 by incorporating a planetary gear, for example. In certain applications, such as an aerial vehicle, it may be desired to have the first external device (such as a first propeller or ring generator 31) rotate in a direction opposite from the second device (such as a second propeller or ring generator 31).

Based on extensive modeling, one embodiment of the present invention is a thrust propulsion device and ring generator for use in an OAV. The present invention may also be used in various other applications, for example, a tail rotor propeller for use in a helicopter. As shown in FIGS. 8A and 8B, a system 1 comprises a rotary motivating mechanism 3 coupled to a driveshaft 7, and a ring assembly 31 having propeller blades 33. The electric power generating system 41 is shown in FIG. 1, with details depicted in FIG. 4.

Two stators 45 are placed in fixed relation on a stationary structure, such as the engine support or duct (not shown). A series of alternating North and South polarity magnets 40 are disposed on the ring assembly 31. In an embodiment, illustrating the principles of the invention, about forty-eight poles are disposed on an inner diameter of the circumferential element 37. The circumferential element 37 also serves as a backer 55. The backer 55 has a radial length of about 3 mm.

The stators 45 comprise a 3-phase configuration consisting of three individual windings 53 separated by stator teeth 57 as shown in FIG. 5. An electric current is induced in the coils 53 when the magnets 40 move relative to the stationary stators 45. A conductive element 43 is coupled to each stator 45 and directed to communicate current with an external apparatus, such as a storage device, or other mechanism.

The thrust propulsion device 1 and ring generator 31 require a rotary motivating mechanism 3 to cause rotation of the blades 33 and magnets 40, for example. One suitable configuration for a rotatable motivating mechanism 3 is an OPOC engine 5, as, for example, described herein and illustrated in FIGS. 6 and 7. The OPOC engine 5 advantageously has compact external package dimensions. By way of example, but not limited thereto, the OPOC engine 5 has an overall outer length 61 of about 370 mm; an outer width 63 of about 75 mm; and an outer height 65 of about 100 mm, and a weight of about less than 9 lbs, producing about 9 horsepower under available fuels, which represent exceptional power-to-size and power-to-weight ratios.

Parameters for another contemplated configuration of the OPOC engine 5 suitable for use in an OAV is shown in the table of FIG. 10. According to FIG. 10, the OPOC engine 5 has a cylinder bore of about 32 mm, and a stroke of about 60 mm. The resulting engine speed is about 9182 rpm and has a compression ratio of about 19. The resulting OPOC engine 5 has an engine power rating of about 35.4 hp with a torque of about 27.5 Nm.

Parameters for certain other contemplated configurations of the OPOC engine 5 and ring generators 31 are shown in the tables of FIG. 11. In "Family 1a", the number of cylinders ("Cyl") ranges from 2 to 6. Thus, a 4 cylinder ("Cyl") OPOC engine 5 would propel a known OAV to a speed of Mach 0.85 ("Mach") and have an engine speed of about 12,500 revolutions per minute ("rpm"). The mean piston speed ("MPS") would be about 11.0 m/sec. The piston stroke would be about 2.64 cm, or about 1.04 inches. The power output would be about 17 horsepower ("hp"), or about 12.7 kilowatts ("kW"). The weight of the engine is about 8.7 lbs, resulting in a ratio of 0.789 lbs/hp. Finally, a desired gear ratio for the transmission would be abo 1:0.66, for example. The table shown in FIG. 11 shows other contemplated configurations, but should not be viewed as limiting. Similar details are provided for "Family 1b," "Family 2," and "Family 3" in the Table.

Modeling results show another embodiment of an OAV according to the present invention. This embodiment includes a ring generator connected to an opposed piston, opposed cylinder engine. FIGS. 8A, 9A and 9B show that multiples of the OPOC engine 5 may be combined. For example, by combining three OPOC engines 5 having 9 horsepower each into a composite engine, the overall horsepower is tripled without exceeding the length 61 of any single OPOC engine 5.

OAV engine cranking (initiating start up of the rotary motivating mechanism), takeoff assist and hover (where excess power is required), and electric power generation can all be provided by a single electrical machine placed at the tip or end radius of helicopter rotor blades, for example. The helicopter rotor blade tips are attached to a mild steel continuous hoop. This hoop functions as the electric machine rotor back iron, serving as a return path for rotor magnetic flux. This hoop also mechanically supports the electric machine rotor permanent magnets at the hoop inside surface. The radial thickness of the hoop is approximately the same radial thickness as the magnets attached to it. The magnets are radial magnetized segments (poles) of permanent magnet material bonded to the inside surface of the hoop. These magnets produce radially directed alternating polarity magnetic flux flow across the machine air gap. The air gap length is approximately equal to the radial thickness of the magnets. The machine stator, windings and back iron, is placed inside the rotor magnets across the air gap. The stator is wound for three-phase AC supply, with individual phase windings placed around individual stator teeth. Normally, there are three stator teeth for each magnetic pole pair in the rotor (these three stator teeth and their windings are referred to as a stator segment), and the stator structure extends completely around the inside surface of the rotor hoop. But it is possible to skip stator segments at uniformly spaced areas in the stator space claim and still have a smoothly operating machine, but with lower torque capability compared to a machine with a full set of stator segments.

An axial view of one stator segment portion of the proposed OAV machine is shown in FIGS. 1, 8A, 9A, and 9B. The illustrations show a ring motor with two stator segments, which can be conveniently attached to the engine structure or the duct (not shown).

The stator teeth OD (referred to as the gap diameter) is about 432 mm, the radial length of the stator lamination iron is about 15 mm, and the air gap, magnet radial thickness, and rotor hoop radial thickness are all about 3 mm. The machine has about 48 magnetic poles and an axial length of active material (magnets and steel) of about 10 mm. The stator teeth are about 5 mm wide and the stator back iron (the lamination steel between the slots and the stator ID surface) has substantially the same radial length as the rotor hoop steel of about 3 mm. The rotor magnets are fabricated with bonded Neodymium material with a residual strength 0.58 Tesla, for example.

With the rotor magnets positioned with respect to the stator segment as shown in FIG. 5 and with equal but opposite directed current in the two coils around the two outside stator teeth, machine torque will be produced at the maximum torque per stator amp capability. This maximum torque per amp drive of the machine can be attained (and maintained) at any rotor position if the stator coil currents are synchronized to the instantaneous rotor position. This rotor position/stator current synchronization process is a function of the machine drive electronics. Assuming this drive synchronization capability is a given, the machine torque production capability can be determined by studying the machine behavior at one rotor position, for example the position shown in FIG. 5.

The flux produced by the rotor permanent magnets is augmented by the flux produced by the stator windings (with only the two outside coils being excited). These coils are assumed to have a uniform current density of about 6 A/mm$^2$ in the winding copper, assumed to fill 45% of the available coil cross sectional area. The interaction of rotor and stator flux produces an equal (but opposite directed) force on the rotor and stator structures. This force on the rotor times its moment arm (the air gap radius) is then the rotor torque. If the rotor is moving, there is a mechanical power flow equal to the rotor torque times the rotor rotational speed. If the rotor torque is in the direction of rotor movement, it is a motoring torque; but if it is the opposite direction the torque is a braking or generating torque. The ring assembly functioning as either a motor or a generator is a function of the current polarity in the stator windings. Synchronized currents in one direction will produce motor action; currents in the opposite direction result in generator action.

Figure 12:
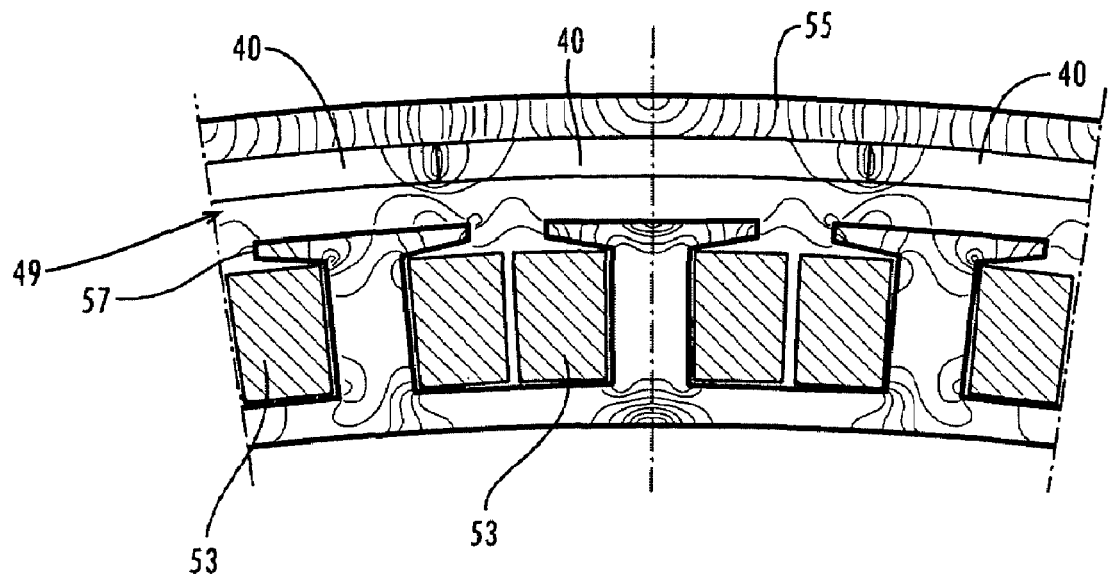
FIG. 12 is a computer-generated flux density map of FIG. 5.

The distributed force (shear stress) within the machine air gap for the flux flow is shown in FIG. 12. The total (integrated) force over the two-pole pitch air gap length of the stator segment of an embodiment shown in FIG. 12 is about 148.5 N per meter of machine axial length. Per pole pair, with an axial stack length of about 10 mm, this is then a machine torque of about 0.321 Nm. A machine with a full set of stator segments of about 24 in total would have a torque of about 7.7 Nm.

Figure 13:
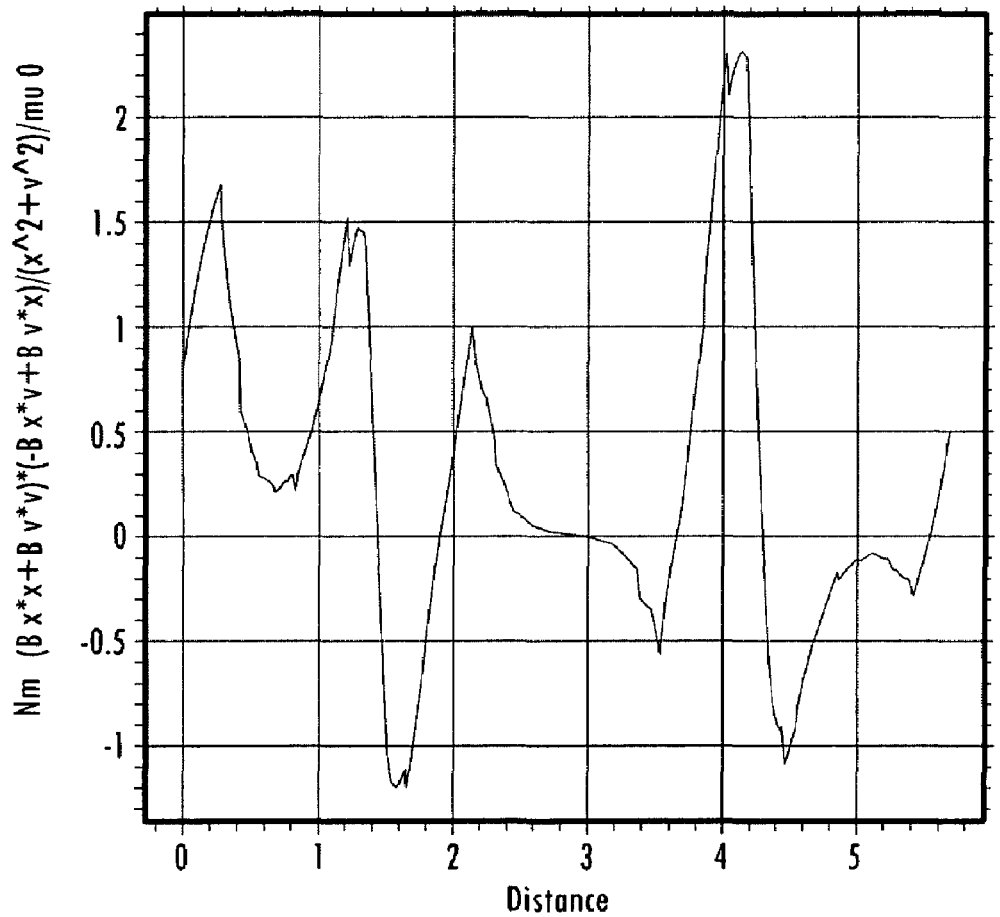
FIG. 13 is a plot of distributed shear force of FIG. 12.

The flux and stress plots of FIGS. 5 and 12 are plotted in FIG. 13. These representations (FIGS. 5, 12-13) are given as examples of the capability of a machine of the given size, construction, and drive. If the peak torque demand of the actual OAV machine is less than the about 7.7 Nm capability shown for this example machine design and drive (e.g. for cranking the OAV engine requires only about 3 Nm), then the design or drive can be changed accordingly. For example, for a machine with the same overall radial dimensions as given above, one can reduce the machine torque capability by reducing the drive current level, by reducing the axial length of the rotor and stator active materials, or by simply deleting stator segments as needed. These are system considerations and will be determined in the machine final design.

The above discussions are based on the given examples of the capability of a machine with the specific size and construction. If the peak torque demand of the machine (for example the cranking force is only about 3 Nm) one can either reduce the drive current level from that assumed above, reduce the axial length of the rotor and stator active materials, or simply delete stator segments as needed. This is a system consideration and will be determined in the machine final design.

Persons skilled in the art will recognize that many modifications and variations are possible in the details, materials, and arrangements of the parts and actions which have been described and illustrated in order to explain the nature of this invention and that such modifications and variations do not depart from the spirit and scope of the teachings and claims contained therein.

Although specific embodiments have been illustrated and described herein for purposes of description of the preferred embodiment, it will be appreciated by those of ordinary skill in the art that a wide variety of alternative and/or equivalent implementations calculated to achieve the same purposes may be substituted for the specific embodiment shown and described without departing from the scope of the present invention. Those with skill in the art will readily appreciate that the present invention may be implemented in a very wide variety of embodiments. This application is intended to cover any adaptations or variations of the embodiments discussed herein. Therefore, it is manifestly intended that this invention be limited only by the claims and the equivalents thereof.

What is claimed:

1. A ring generator comprising:
   a first rotatable hub having a first hub axis of rotation;
   a first plurality of blades coupled to, radially-disposed from, and spread around the first rotatable hub;
   an engine coupled to the first rotatable hub so as to impart rotary motion to the first rotatable hub;
   a first magnetic flux generating element;
   a first current conducting element;
   wherein either the first magnetic flux generating element or the first current conducting element is fixedly disposed in relation to the first rotatable hub at a specified radius; and
   the first magnetic flux generating element and the first current conducting element cooperate so that during rotation of the first rotatable hub, an electric current flow is induced in the first current conducting element.

2. The ring generator of claim 1 wherein the first plurality of blades is in substantially coplanar arrangement.

3. The ring generator of claim 1 wherein the engine is disposed within a cylinder defined by the specified radius and the first hub axis of rotation.

4. The ring generator of claim 1 wherein the blades are adapted to provide propulsive thrust when the first rotatable hub rotates.

5. The ring generator of claim 4 further comprising an external electrical system of an aerial vehicle wherein the ring generator is electrically coupled to the external electrical system of the aerial vehicle so as to receive current from the first current conducting element based on its cooperation with the first magnetic flux generating element.

6. The ring generator of claim 1 further comprising a plurality of non-contiguous, symmetrically arranged arc segments arranged about a given radius at the end of the blades.

7. The ring generator of claim 1 wherein a plurality of non-contiguous, symmetrically arranged arc segments comprises three arc segments arranged at about 120 degrees apart.

8. The ring generator of claim 1 further comprising a second current conducting element fixedly disposed in relation to the first current conducting element and arranged at about equidistant from the first current conducting element.

9. The ring generator of claim 1 further comprising:
   a second rotatable hub having a second hub axis of rotation;
   a second plurality of blades coupled to, radially-disposed from, and spread around the second rotatable hub;
   a second magnetic flux generating element;
   a second current conducting element;
   wherein either the second magnetic flux generating element or the second current conducting element is fixedly disposed in relation to the second rotatable hub; and
   the second magnetic flux generating element and the second current conducting element cooperate so that during rotation of the second rotatable hub, a second electric current flow is induced;
   wherein the engine is coupled to the second rotatable hub so as to impart rotary motion to the second rotatable hub.

10. The ring generator of claim 9 wherein the first hub axis of rotation and the second hub axis of rotation are coextensive.

11. The ring generator of claim 10 wherein the rotary motion imparted to the first rotatable hub is in the opposite direction to the rotary motion imparted to the second rotatable hub.

12. The ring generator of claim 1 wherein the engine comprises a first opposed piston, opposed cylinder engine module.

13. The ring generator of claim 12 wherein the engine further comprises a second opposed piston, opposed cylinder module.

14. The ring generator of claim 13 further comprising a clutching mechanism coupled between an engine module and the first rotatable hub to decouple the engine module from imparting rotary motion to the first rotatable hub.

15. The ring generator of claim 13 wherein the engine further comprises a third opposed piston, opposed cylinder module.

16. The ring generator of claim 1 wherein the engine has a weight to power ratio of about 0.76 to about 2.46 horsepower per pound.

17. The ring generator of claim 16 wherein the engine has a power output of about 9 to about 42 horsepower.

18. The ring generator of claim 16 wherein the engine has a weight to power ratio of about 1.21 to about 2.25 horsepower per pound.

19. The ring generator of claim 18 wherein the engine has a power output of about 1.5 to about 35 horsepower.

20. The ring generator of claim 1 wherein the magnetic flux generating element is fixedly disposed in relation to the first rotatable hub.

21. The ring generator of claim 20 further comprising a second magnetic flux generating element that is fixedly disposed in relation to the first rotatable hub at a specified radius.

* * * * *